A. E. GRAVES.
ELECTRICAL EGG TESTER.
APPLICATION FILED OCT. 30, 1913.
1,100,556.
Patented June 16, 1914.
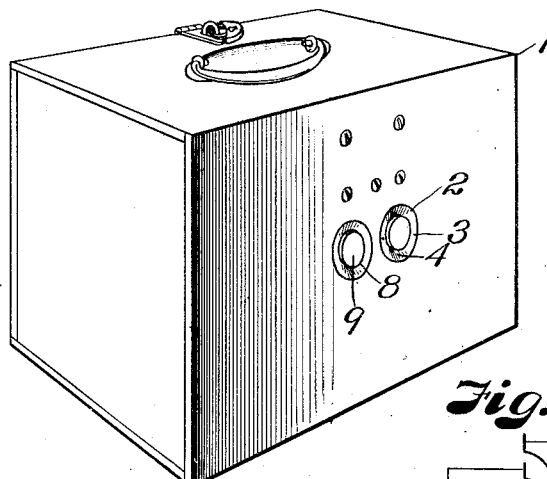
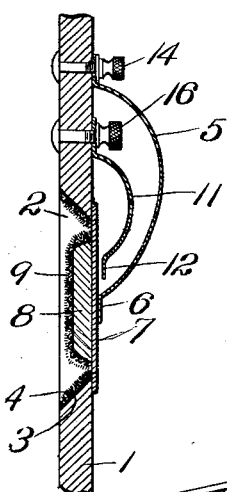
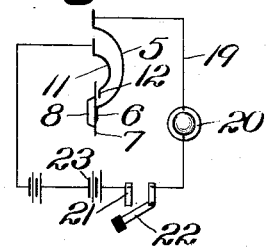
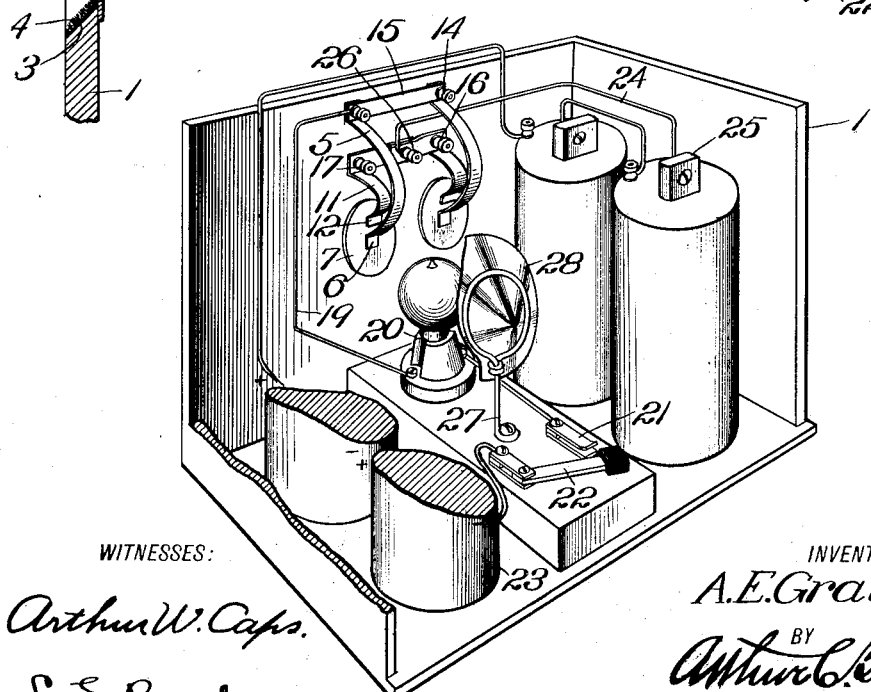
WITNESSES:
Arthur W. Caps.
L. E. Coats.
INVENTOR
A. E. Graves.
BY
Arthur C. Brown.
ATTORNEY

UNITED STATES PATENT OFFICE.

ALBERT E. GRAVES, OF LENEXA, KANSAS.

ELECTRICAL EGG-TESTER.

1,100,556.  Specification of Letters Patent.  Patented June 16, 1914.

Application filed October 30, 1913. Serial No. 798,168.

*To all whom it may concern:*

Be it known that I, ALBERT E. GRAVES, a citizen of the United States, residing at Lenexa, in the county of Johnson and State of Kansas, have invented certain new and useful Improvements in Electrical Egg-Testers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an electrical egg tester, and has for its principal object to provide a device of that character, wherein a circuit is closed when an egg is placed in position for testing, and broken when the egg is removed; in order that current may be used only when the device is in operation and thereby effect a saving of the electrical supply.

It is also an object of the invention to provide a structure comprising a plurality of testing apertures, so that two or more eggs may be tested simultaneously, and to provide covers for the apertures, which are adapted for automatic actuation to uncover the opening only when an egg is placed in the testing position, so that light from the testing lamp can reach the exterior of the apparatus only through the aperture to which an egg is placed.

In accomplishing these and other objects of the invention, I have provided improved details of structure the preferred forms of which are illustrated in the accompanying drawings, wherein:—

Figure I is a perspective view of an egg tester constructed according to my invention. Fig. II is an interior perspective of the tester, taken from the rear. Fig. III is an enlarged vertical section of one of the testing apertures, showing the cushion and its carrying and circuit closing mechanism. Fig. IV is a circuit diagram.

Referring more in detail to the parts:— 1 designates a casing within which the operative parts of the device are mounted, and which is provided with apertures 2 through which light may be diffused from the interior of the casing; the apertures being of any suitable number and each preferably comprising an outwardly beveled surface 3 having a lining 4 of cloth or other soft material, against which an egg may be placed without danger of breaking. Mounted on the interior of the casing adjacent each of the apertures is a leaf-spring 5 having a loose end 6 carrying a plate 7, and fixed on said plate is a cushion 8, which is adapted to project yieldingly into the aperture 2, and has a soft covering 9 against which an egg to be tested may be projected to force the cushion inwardly and uncover the aperture; the plate 7 being wider than the cushion, in order that it may project over the inner edges of the aperture and effectually hide the light from a lamp that is contained within the casing. Also fixed to the inner surface of the casing, adjacent each of the apertures, is a contact member 11, having a free end 12 adapted for contact by the cushion plate 7, when the latter is moved against the tension of its carrying spring, so that a circuit may be closed between the fixed ends of the cushion spring, and contact member, when such parts are suitably connected with the source of electrical supply.

When the tester comprises two or more testing apertures, I provide each of the springs 5 with a binding post 14, and extend a circuit bar 15 between the various springs and hold the bar to the springs by the binding posts 14, which attach the springs to the casing, and equip the contact members 11 with binding posts 16 and bars 17. With this construction I connect a terminal wire 19 with the bar 15, preferably by means of one of the binding posts 14 and extend same through a lamp 20, which may be suitably mounted within the casing, to a contact point 21 of a switch 22, and thence to the battery 23. The other terminal 24 is preferably extended from a binding post 26 on the bars 17, which connects the cushion contacts 11 and is connected with the opposite pole 25 of the battery, so that when the switch is closed and either of the cushions opened, contact is made between the cushion plate and a relative contact member 11, so that a circuit is closed through the lamp and the latter illuminated.

In using the apparatus, presuming the parts to be constructed and assembled as described, and the switch closed; the springs 5 normally retain the cushions in the testing apertures and the cushion plates out of touch with the contact members 11, so that the circuit is opened and the lamp remains dark. When an egg is to be tested, it is placed in the aperture and pushed against the cushion, so that the latter is moved back against the tension of its carrying spring and into touch with the contact member 11, so that a circuit is closed from one terminal of the battery through the switch and lamp to the spring that carries the cushion through the cushion plate to the contact member 11, and back to the battery through the other terminal, thereby illuminating the lamp, so that light therefrom will shine against the egg, which is located in the testing aperture, in order that the person holding the egg may determine its condition. It is apparent that as soon as the egg is removed from the aperture, the cushion is automatically moved back to closed position to cover the aperture and break the circuit, so that the lamp is extinguished and drain on the battery obviated. It is also apparent that as the apparatus is wired in multiple, the circuit may be closed from any of the apertures, and that the apertures may be used simultaneously. It is also apparent that when the device is to be idle for a considerable period the switch may be opened in order that the circuit may remain open even though a person should manipulate the hoods.

In order to secure the greatest efficiency from the lamp, I provide same with the reflector, preferably comprising a standard 27, which is arranged back of the lamp and carries a reflector 28 of any suitable type.

Having thus described my invention, what I claim as new therein and desire to secure by Letters-Patent, is:—

1. An electrical egg tester, comprising a casing having an aperture therein, a cushion yieldably covering the aperture, a contact member adjacent the cushion, and circuit members connected with the cushion and contact member, for the purpose set forth.

2. An electrical egg tester, comprising a casing having an aperture therein, a spring mounted in said casing, a cushion mounted on said spring and adapted for covering the aperture, a contact member mounted in the casing and adapted for engagement by the cushion, a lamp, a source of electrical supply, and circuit lines connecting the source of electrical supply with the spring and contact member and including the lamp.

3. An electrical egg tester comprising an aperture having an outwardly beveled, cushioned edge, a yieldable support, a plate carried by said support and adapted to overlie the inner edge of said aperture, a cushion mounted on said plate and adapted for projection into said aperture, a contact member normally spaced from said plate, a source of electrical supply, circuit lines connecting the source of electrical supply with the yieldable support and with the contact member, and a lamp interposed in one of the circuit lines.

4. An electrical egg tester comprising a casing having a plurality of apertures, a yieldable support for each of said apertures, conductive means connecting said supports, a cushion mounted on each of said supports and adapted for closing said apertures, contact members arranged adjacent the apertures and adapted for engagement by said cushions, conductive means connecting said contact member, a source of electrical supply, circuit lines connected with the separate conductive means, and a lamp interposed in one of the circuit lines.

5. An electrical egg tester comprising a casing having a plurality of apertures, a yieldable support for each of said apertures, conductive means connecting said supports, a cushion mounted on each of said supports and adapted for closing said apertures, contact members arranged adjacent the apertures and adapted for engagement by said cushions, conductive means connecting said contact member, a source of electrical supply, circuit lines connected with the separate conductive means, and a lamp and a switch interposed in the circuit lines.

6. An electrical egg tester, comprising a casing having an aperture therein, a spring mounted in said casing, a cushion mounted on said spring and adapted for covering the aperture, a contact member mounted in the casing and adapted for engagement by the cushion, a lamp, a source of electrical supply, and circuit lines connecting the source of electrical supply with the spring and contact member and including the lamp, a standard back of said lamp and a reflector mounted on said standard.

In testimony whereof I affix my signature in presence of two witnesses.

ALBERT E. GRAVES.

Witnesses:
J. L. BRIDGES,
L. E. KLINGLER.